(12) United States Patent
Wang et al.

(10) Patent No.: US 10,021,750 B2
(45) Date of Patent: Jul. 10, 2018

(54) LIGHT SOURCE DEVICE AND CONTROL METHOD THEREOF, BACKLIGHT MODULE AND LIQUID CRYSTAL DISPLAY DEVICE

(71) Applicants: BOE TECHNOLOGY GROUP CO., LTD., Beijing (CN); BOE (HEBEI) MOBILE DISPLAY TECHNOLOGY CO., LTD., Gu'An, Hebei (CN)

(72) Inventors: Chenru Wang, Beijing (CN); Xue Dong, Beijing (CN); Guangquan Wang, Beijing (CN); Haiwei Sun, Beijing (CN); Lili Chen, Beijing (CN); Ruijun Dong, Beijing (CN); Zhihui Zeng, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

(*) Notice: Subject to any disclaimer, the term of this patent is extended or adjusted under 35 U.S.C. 154(b) by 183 days.

(21) Appl. No.: 14/913,100

(22) PCT Filed: Sep. 16, 2015

(86) PCT No.: PCT/CN2015/089725
§ 371 (c)(1),
(2) Date: Feb. 19, 2016

(87) PCT Pub. No.: WO2016/169196
PCT Pub. Date: Oct. 27, 2016

(65) Prior Publication Data
US 2017/0064789 A1    Mar. 2, 2017

(30) Foreign Application Priority Data

Apr. 22, 2015 (CN) .......................... 2015 1 0194968

(51) Int. Cl.
*H05B 33/08* (2006.01)
*F21V 5/00* (2018.01)
(Continued)

(52) U.S. Cl.
CPC ......... *H05B 33/0857* (2013.01); *F21V 5/008* (2013.01); *G02B 6/0081* (2013.01);
(Continued)

(58) Field of Classification Search
None
See application file for complete search history.

(56) References Cited

U.S. PATENT DOCUMENTS 8,111,023 B2    2/2012  Sun et al.
2009/0140669 A1  6/2009  Masten, Jr. et al.
(Continued)

FOREIGN PATENT DOCUMENTS

CN    201344389 Y    11/2009
CN    101600898 A    12/2009
(Continued)

OTHER PUBLICATIONS

International Search Report and Written Opinion dated Jan. 7, 2016; PCT/CN2015/089725.
(Continued)

*Primary Examiner* — Gustavo Polo
(74) *Attorney, Agent, or Firm* — Ladas & Parry LLP (57) ABSTRACT

A light source device (01) and a control method thereof, a backlight module and a liquid crystal display device are provided. The light source device (01) comprises: a plurality of light emitting chips (011), the plurality of light emitting chips (011) including a first light emitting chip capable of emitting visible light of a first color, the control method of the light source device (01) comprising: causing the plurality of light emitting chips (011) to emit light simultaneously in
(Continued)

order to obtain an operating visible light spectrum; obtaining a first energy ratio of the visible light of the first color in the operating visible light spectrum; comparing the first energy ratio with a target energy ratio; and adjusting the first energy ratio to the target energy ratio, in response to that the first energy ratio is different from the target energy ratio. Thereby, a problem of a higher ratio of blue light in an LED light source is solved, so as to achieve an eye-protection effect.

9 Claims, 5 Drawing Sheets

(51) Int. Cl.
    *G02F 1/1335*     (2006.01)
    *F21Y 115/10*     (2016.01)
    *F21V 8/00*     (2006.01)

(52) U.S. Cl.
    CPC .. *G02F 1/133512* (2013.01); *G02F 1/133514* (2013.01); *G02F 1/133603* (2013.01); *G02F 1/133606* (2013.01); *G02F 1/133609* (2013.01); *H05B 33/086* (2013.01); *F21Y 2115/10* (2016.08); *G02B 6/003* (2013.01); *G02F 2001/133607* (2013.01); *G02F 2001/133612* (2013.01); *G02F 2001/133624* (2013.01); *Y02B 20/341* (2013.01)

(56) References Cited

U.S. PATENT DOCUMENTS

2010/0277410 A1* 11/2010 You .................... G09G 3/3413
                                                      345/102
2014/0126185 A1    5/2014 Hsieh et al.

FOREIGN PATENT DOCUMENTS

| | | |
|---|---|---|
| CN | 101790264 A | 7/2010 |
| CN | 102573229 A | 7/2012 |
| CN | 202488805 U | 10/2012 |
| CN | 103268039 A | 8/2013 |
| CN | 103413495 A | 11/2013 |
| CN | 104879681 A | 9/2015 |

OTHER PUBLICATIONS

First Chinese Office Action dated Nov. 10, 2016; Appln. No. 201510194968.7.

* cited by examiner

LIGHT SOURCE DEVICE AND CONTROL METHOD THEREOF, BACKLIGHT MODULE AND LIQUID CRYSTAL DISPLAY DEVICE

TECHNICAL FIELD

Embodiments of the present disclosure relate to a light source device and a control method thereof, a backlight module and a liquid crystal display device.

BACKGROUND

With continuous development of liquid crystal display technology, liquid crystal display device is widely used in electric power, medical treatment, biochemistry, textile, food inspection, chromatography, electronic measurement, automotive electronics, data collection and other fields. The liquid crystal display device generally includes: a display panel and a backlight module, wherein, the backlight module includes a light source, and the backlight module can provide the light source for a display panel, so that the display panel displays an image normally.

In a related art, the light source is usually a Light Emitting Diode (LED) light source, and the LED uses a blue chip together with yellow phosphor powder, to emit white light after mixing. Exemplarily, the blue chip may be an electroluminescent chip; when powered up, the blue chip can emit blue light, the blue light emitted from the blue chip excites the yellow phosphor powder to emit yellow light, and the blue light is mixed with the yellow light, so as to form the white light.

SUMMARY

An embodiment of the present disclosure provides a control method of a light source device, wherein, the light source device comprises: a plurality of light emitting chips, the plurality of light emitting chips including a first light emitting chip capable of emitting visible light of a first color, the method comprising: causing the plurality of light emitting chips to emit light simultaneously in order to obtain an operating visible light spectrum; obtaining a first energy ratio of the visible light of the first color in the operating visible light spectrum; comparing the first energy ratio with a target energy ratio; and adjusting the first energy ratio to the target energy ratio, in response to that the first energy ratio is different from the target energy ratio.

In one example, the target energy ratio is an energy ratio of the visible light of the first color in a solar visible light spectrum.

In one example, in response to that the first energy ratio is different from the target energy ratio, a current supplied to the first light emitting chip is changed in order to adjust the first energy ratio to the target energy ratio.

Another embodiment of the present disclosure provides a light source device, comprising: a plurality of light emitting chips and a control unit, wherein, the plurality of light emitting chips include a first light emitting chip for emitting visible light of a first color; the control unit is configured to obtain a first energy ratio of the visible light of the first color in an operating visible light spectrum in a case where the plurality of light emitting chips emit light simultaneously, compare the first energy ratio with a target energy ratio, and adjust the first energy ratio to the target energy ratio, in response to that the first energy ratio is different from the target energy ratio.

In one example, the target energy ratio is an energy ratio of the visible light of the first color in a solar visible light spectrum.

In one example, the control unit is configured to change a current supplied to the first light emitting chip in order to adjust the first energy ratio to the target energy ratio, in response to that the first energy ratio is different from the target energy ratio.

A further embodiment of the present disclosure provides a backlight module, comprising the above-described light source device.

In one example, the backlight module further comprises: a first lens and a second lens disposed on a light output side of the plurality of light emitting chips, wherein, the first lens is disposed between the second lens and the plurality of light emitting chips, the first lens is configured to converge light rays from the plurality of light emitting chips, and the second lens is configured to change convergent light rays emitted from the first lens into parallel light rays.

In one example, the backlight module further comprises: a light guide plate, the light source device being disposed on a back surface of the light guide plate; or, the light source device being disposed on a side surface of the light guide plate.

A further embodiment of the present disclosure provides a liquid crystal display device, comprising: a display panel and the above-described backlight module.

In one example, the display panel includes an array substrate and a color filter substrate cell-assembled, the color filter substrate including a color filter layer, and the color filter layer including a black matrix and an open region.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the disclosure.

DETAILED DESCRIPTION

The technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the disclosure.

The inventors found that the related art at least has problems as follows: white light formed by using a blue LED has a relative high ratio of blue light. However, the blue light has a relative high frequency which is likely to cause visual fatigue to human eyes, and even lead to retinal damage.

Prior to detailed description of the embodiments of the present disclosure, firstly, solar light and solar light spectrum involved in the embodiments of the present disclosure are briefly introduced.

The solar light, namely, sunlight, usually having a color temperature of 5700 K (Kelvin), can be regarded as warm light, can reveal the most realistic color of an object, and is not apt to cause visual fatigue to the human eyes.

Light rays emitted from the sun cover a very wide range, from an electromagnetic wave to an ultraviolet ray. The solar light spectrum involved in the embodiments of the present disclosure refers to the solar light spectrum of visible light. A wavelength range of the visible light is between 770-350 nm. In the visible light, light rays of different ranges of wavelengths bring different perceptions of colors to the human eyes, wherein, when the wavelength range is 770-622 nm, the human eyes perceive the color as red; when the wavelength range is 622-597 nm, the human eyes perceive the color as orange; when the wavelength range is 597-577 nm, the human eyes perceive the color as yellow; when the wavelength range is 577-492 nm, the human eyes perceive the color as green; when the wavelength range is 492-455 nm, the human eyes perceive the color as indigo; when the wavelength range is 455-350 nm, the human eyes perceive the color as violet; and in the solar light spectrum (a standard solar visible light spectrum), ratios of the light rays of respective colors are evenly distributed.

Figure 1:
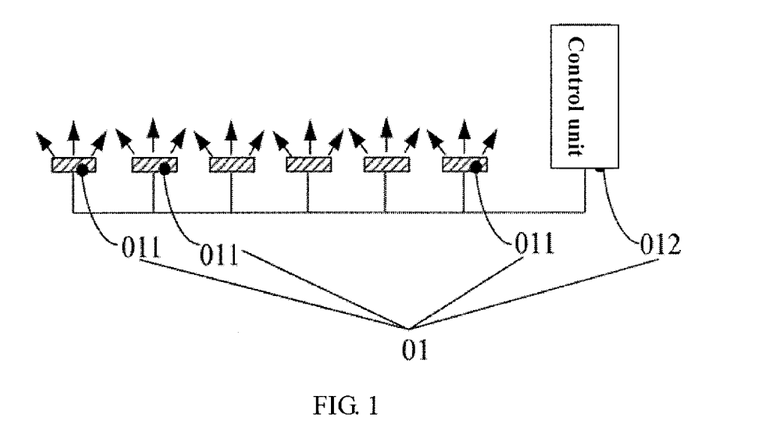
FIG. 1 is a structural schematic diagram of a light source provided by an embodiment of the present disclosure.

FIG. 1 shows a structural schematic diagram of a light source 01 provided by an embodiment of the present disclosure. With reference to FIG. 1, the light source 01 comprises: a plurality of light emitting chips 011 and a control unit 012.

Each light emitting chip 011 is connected with the control unit 012.

The control unit 012 is configured for obtaining wavelengths corresponding to peak values of sub-wave peaks of visible light of the respective colors in the standard solar visible light spectrum, according to the standard solar visible light spectrum; determining a ratio of spectrum energy of visible light of a first color within a preset range to spectrum energy of the standard solar visible light, according to a wavelength corresponding to a peak value of a sub-wave peak of the visible light spectrum of the first color; controlling a first light emitting chip to emit light, according to the ratio of the spectrum energy of the visible light of the first color to the spectrum energy of the standard solar visible light, so that a ratio of luminous flux of light emitted from the first light emitting chip to luminous flux of light emitted from the plurality of light emitting chips is equal to the ratio of the spectrum energy of the visible light of the first color to the spectrum energy of the standard solar visible light.

Herein, the visible light of the first color is visible light of any one color in the standard solar visible light spectrum, the first light emitting chip is a light emitting chip capable of emitting the visible light of the first color, and wavelength ranges of light emitted from the plurality of light emitting chips are within a wavelength range of the standard solar visible light.

Since the luminous flux is light energy arriving at, departing from or passing through a curved surface per unit of time, the ratio of the luminous flux of light emitted from the first light emitting chip and the luminous flux of light emitted from the plurality of light emitting chips is just the ratio of the light energy of light emitted from the first light emitting chip to the light energy of light emitted from the plurality of light emitting chips.

In summary, the light source device provided by the embodiment of the present disclosure, the spectrum energy of the visible light of the first color to the spectrum energy of the standard solar visible light, controls the first light emitting chip to emit light according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of the respective colors are evenly distributed, which solves the problem that the relative high ratio of the blue light in the LED light source causes visual fatigue to the human eyes and even leads to retinal damage, and thus achieving an eye-protection effect.

Figure 2:
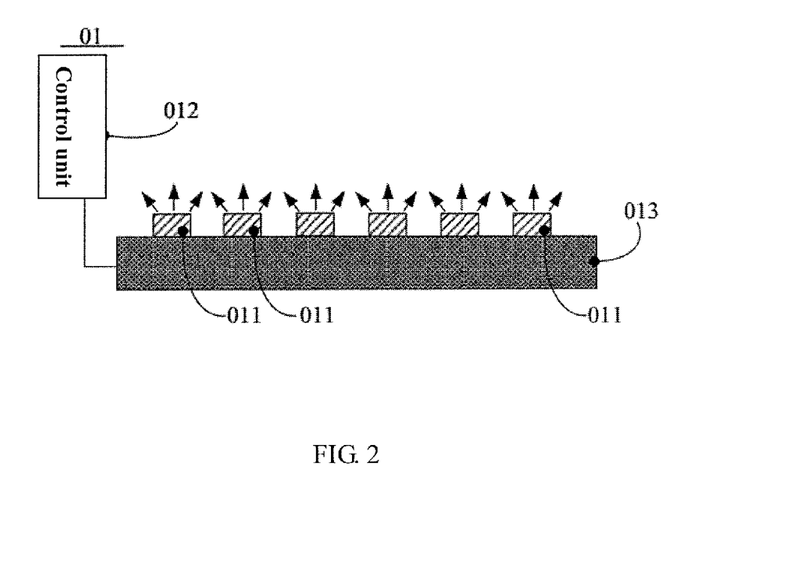
FIG. 2 is a structural schematic diagram of another light source provided by an embodiment of the present disclosure.

FIG. 2 shows a structural schematic diagram of another light source 01 provided by an embodiment of the present disclosure. With reference to FIG. 2, the light source 01 comprises: a plurality of light emitting chips 011, a control unit 012, and a heat radiating supporter 013.

The plurality of light emitting chips 011 are evenly disposed on the heat radiating supporter 013, and each light emitting chip 011 is connected with the control unit 012. Herein, the light emitting chip 011 may be an electro-induced light emitting chip or a field-induced light emitting chip, etc., and the embodiment of the present disclosure is illustrated with the light emitting chip 011 being the electro-induced light emitting chip as an example. The control unit 012 may be directly connected with each light emitting chip 011 through an electric wire, or may be respectively connected with each light emitting chip 011 through the heat radiating supporter 013. Exemplarily, as shown in FIG. 2, there is a case where the control unit 012 is respectively connected with each light emitting chip 011 through the heat radiating supporter 013. For example, the control unit 012 is connected with the heat radiating supporter 013, the light emitting chip 011 is disposed on the heat radiating supporter 013, and the control unit 012 is connected with the light emitting chip 011.

Herein, the number of the light emitting chips 011 may be set according to an actual need, and exemplarily, the number of the light emitting chips may be 6, i.e., each light emitting chip 011 corresponds to the visible light of one color in the standard solar visible light spectrum. Alternatively, the number of the light emitting chips 011 may also be greater than 6, and in this case, the visible light of one color in the standard solar visible light spectrum may correspond to a plurality of light emitting chips 011; as shown in FIG. 2, it is illustrated in the embodiment of the present disclosure with the number of the light emitting chips 011 being 6 as an example. The standard solar visible light spectrum may be D65 solar spectrum.

The control unit 012 is configured for obtaining wavelengths corresponding to peak values of sub-wave peaks of visible light of various colors in the standard solar visible light spectrum, according to the standard solar visible light spectrum; determining a ratio of spectrum energy of visible light of a first color within a preset range to spectrum energy of the standard solar visible light, according to a wavelength corresponding to the peak value of the sub-wave peak of the visible light spectrum of the first color; controlling a first light emitting chip to emit light, according to the ratio of the spectrum energy of the visible light of the first color to the spectrum energy of the standard solar visible light, so that a ratio of luminous flux of light emitted from the first light emitting chip to luminous flux of light emitted from the plurality of light emitting chips is equal to the ratio of the spectrum energy of the visible light of the first color to the spectrum energy of the standard solar visible light. Herein, the visible light of the first color is the visible light of any one color in the standard solar visible light spectrum, the first light emitting chip is the light emitting chip capable of emitting the visible light of the first color, and the wavelength ranges of light emitted from the plurality of light emitting chips are within the wavelength range of the standard solar visible light.

Figure 3:
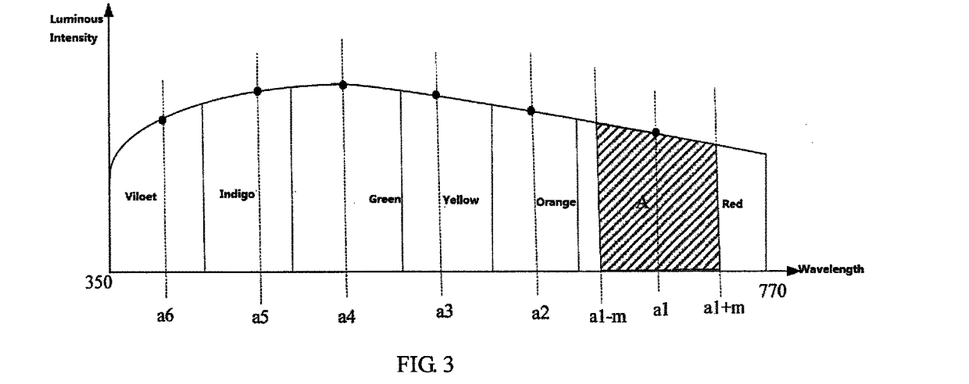
FIG. 3 is a diagram showing the intensity distribution of the standard solar visible light spectrum provided by an embodiment of the present disclosure.

For example, FIG. 3 is a diagram showing the intensity distribution of the standard solar visible light spectrum. With reference to FIG. 3, in the standard solar visible light spectrum, along with reduction of the wavelength, the colors of the visible light are sequentially presented as: red, orange, yellow, green, indigo and violet.

The control unit 012 performs scanning point sampling on the standard solar visible light spectrum, and can obtain peak value sampling points of n sub-wave peaks. The peak value sampling point of each sub-wave peak corresponds to one wavelength which may be referred to as a main wavelength of the sub-wave peak. In the embodiment of the present disclosure, it is assumed that n is 6, then the control unit 012 can obtain 6 main wavelengths. As shown in FIG. 3, visible light of each color corresponds to one main wavelength, wherein, the main wavelength of red light is $a1$, the main wavelength of orange light is $a2$, the main wavelength of yellow light is $a3$, the main wavelength of green light is $a4$, the main wavelength of indigo light is $a5$, and the main wavelength of violet light is $a6$. It should be noted that, n may further be a numerical value greater than 6, and in this case, the visible light of each color may have a plurality of peak values.

After obtaining the n main wavelengths, the control unit 012 determines the ratio of the spectrum energy of the visible light of the first color to the spectrum energy of the standard solar visible light, wherein, the visible light of the first color is the visible light of any one color in the standard solar visible light spectrum. The preset range is a range with the main wavelength of the visible light of the first color as a center, floating left and right by m; for example, as shown in FIG. 3, it is assumed that the visible light of the first color is red light, then the preset range may be $[a1-m, a1+m]$, where a specific numerical value of m may be set according to an actual situation, which will not be limited by the embodiment of the present disclosure; and exemplarily, m may be 0.5.

Herein, the spectrum energy of the visible light of the first color within the preset range may be: an area of the spectrum within the preset range; and as shown in FIG. 3, it is assumed that an area of a shadow Portion A within the range $[a1-m, a1+m]$ is S1, then S1 is just the spectrum energy of the visible light of the first color. Herein, it is assumed that an area of the standard solar visible light spectrum as shown in FIG. 3 is S, then, the ratio of the spectrum energy of the visible light of the first color to the spectrum energy of the standard solar visible light is S1/S.

After obtaining the ratio of the spectrum energy of the visible light of the first color to the spectrum energy of the standard solar visible light, the control unit 012 controls the first light emitting chip to emit light, according to the ratio of the spectrum energy of the visible light of the first color to the spectrum energy of the standard solar visible light, wherein, it is assumed that the visible light of the first color is, for example, red light, then, the first light emitting chip is a chip capable of emitting red light; and in the embodiment of the present disclosure, the control unit 012 controlling the first light emitting chip to emit light, according to the ratio of the spectrum energy of the visible light of the first color to the spectrum energy of the standard solar visible light, includes that:

The control unit 012 finds a light emitting chip corresponding to the main wavelength of the visible light of the first color, according to the main wavelength of the visible light of the first color, the light emitting chip just being the first light emitting chip. Exemplarily, the control unit 012 can maintain a corresponding relationship between the main wavelength and the light emitting chip, wherein, each light emitting chip can be a chip capable of emitting light of a color of a wave band to which the corresponding main wavelength belongs. Exemplarily, the first light emitting chip is a chip capable of emitting light of a color of a wave band to which the main wavelength $a1$ belongs, and with reference to FIG. 3, the first light emitting chip is the chip capable of emitting red light. The control unit 012 can find the corresponding relationship between the main wavelength and the light emitting chip according to the main wavelength of the visible light of the first color, to obtain the light emitting chip corresponding to the main wavelength of the visible light of the first color.

After finding out the first light emitting chip, the control unit 012 applies a current of a preset intensity to the first light emitting chip, so that the first light emitting chip emits light. Herein, the current of the preset intensity is a current which makes the ratio of the luminous flux of light emitted from the first light emitting chip to the luminous flux of light emitted from the plurality of light emitting chips equal to the ratio of the spectrum energy of the visible light of the first color to the spectrum energy of the standard solar visible light.

Herein, the current of the preset intensity is determined by experiments in advance; in the embodiment of the present disclosure, the number of the light emitting chips is 6, and a process of determining the current of the preset intensity may include that:

The control unit 012 applies a current $i1$ to each light emitting chip, then, each light emitting chip will emit light;

it is assumed that the luminous flux of light emitted from the first light emitting chip is p1, and total luminous flux of light emitted from the 6 light emitting chips is p, then, the ratio of the luminous flux of light emitted from the first light emitting chip to the luminous flux of light emitted from the 6 light emitting chips is p1/p; if p1/p=S1/S, then the control unit 012 determines the current of the preset intensity as i1, and if p1/p≠S1/S, then the control unit 012 applies a current i2 to each light emitting chip, and continues to repeat the above process, until p1/p=S1/S, and the control unit 012 obtains the current of the preset intensity corresponding to the first light emitting chip. In a similar way, the current of the preset intensity corresponding to other light emitting chips can be obtained.

It should be noted that, in the embodiment of the present disclosure, the wavelength ranges of light emitted from the plurality of light emitting chips are within the wavelength range of the standard solar visible light, that is, the wavelength ranges of light emitted from the plurality of light emitting chips are between 770-350 nm.

Since the luminous flux is light energy arriving at, departing from or passing through the curved surface per unit of time, the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips.

In summary, the light source device provided by the embodiment of the present disclosure, controls the first light emitting chip to emit light according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of respective colors are evenly distributed, which solves the problem that the relative high ratio of the blue light in the LED light source causes visual fatigue to the human eyes and even leads to retinal damage, and thus achieving an eye-protection effect.

The light source device provided by the embodiment of the present disclosure can work by using a control method hereinafter. Description in respective embodiments hereinafter can be referred to for the control method of the light source device according to the embodiment of the present disclosure.

Figure 4:
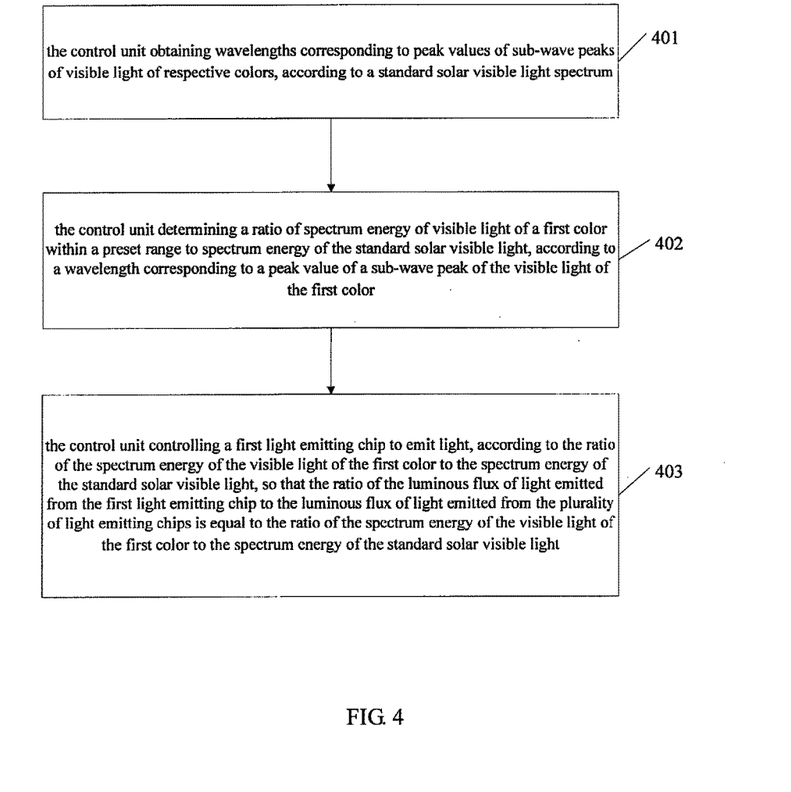
FIG. 4 is a method flow chart of a control method of a light source provided by an embodiment of the present disclosure.

FIG. 4 shows a method flow chart of the control method of the light source provided by the embodiment of the present disclosure, wherein, the light source may be a light source as shown in FIG. 1 or FIG. 2. The light source comprises: a plurality of light emitting chips and a control unit, each light emitting chip being connected with the control unit. With reference to FIG. 4, the method process comprises, for example:

Step 401: the control unit obtaining wavelengths corresponding to peak values of sub-wave peaks of visible light of respective colors, according to a standard solar visible light spectrum.

Step 402: the control unit determining a ratio of spectrum energy of visible light of a first color within a preset range to spectrum energy of the standard solar visible light, according to a wavelength corresponding to a peak value of a sub-wave peak of the visible light of the first color.

Herein, the visible light of the first color is the visible light of any one color in the standard solar visible light spectrum.

Step 403: the control unit controlling a first light emitting chip to emit light, according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light.

Herein, the first light emitting chip is a light emitting chip capable of emitting the visible light of the first color, and wavelength ranges of light emitted from the plurality of light emitting chips are within a wavelength range of the standard solar visible light.

Alternatively, the first light emitting chip is an electro-induced light emitting chip.

Step 403 may include: the control unit applying a current of a preset intensity to the first light emitting chip, according to the ratio of the spectrum energy of the visible light of the first color to the spectrum energy of the standard solar visible light.

Herein, the current of the preset intensity is a current which makes the ratio of the luminous flux of light emitted from the first light emitting chip to the luminous flux of light emitted from the plurality of light emitting chips equal to the ratio of the spectrum energy of the visible light of the first color to the spectrum energy of the standard solar visible light.

In summary, the control method of the light source device provided by the embodiment of the present disclosure, according to the ratio of the spectrum energy of the visible light of the first color to the spectrum energy of the standard solar visible light, controls the first light emitting chip to emit light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of respective colors are evenly distributed, which solves the problem that the relative high ratio of the blue light in the LED light source causes visual fatigue to the human eyes and even leads to retinal damage, and thus achieving an eye-protection effect.

Figure 5:
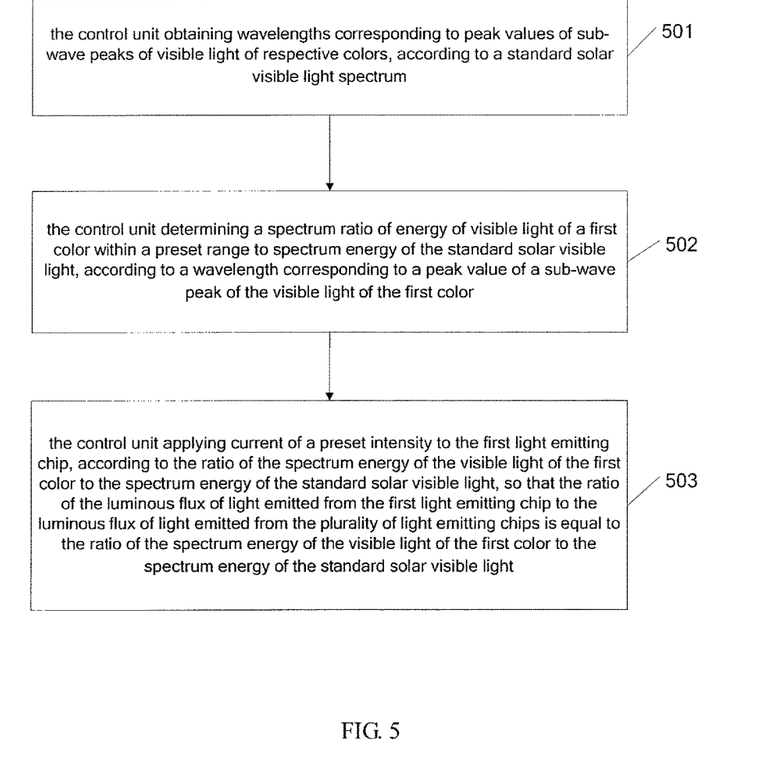
FIG. 5 is a method flow chart of another control method of a light source provided by an embodiment of the present disclosure.

FIG. 5 shows a method flow chart of a control method of another light source provided by an embodiment of the present disclosure, wherein, the light source may be a light source as shown in FIG. 1 or FIG. 2. The light source comprises: a plurality of light emitting chips and a control unit. The light source may further comprise: a heat radiating supporter, the plurality of light emitting chips being evenly disposed on the heat radiating supporter, and each light emitting chip being connected with the control unit. Herein, this embodiment is illustrated with the light emitting chip being an electro-induced light emitting chip as an example. With reference to FIG. 5, the method process comprises, for example:

Step 501: the control unit obtaining wavelengths corresponding to peak values of sub-wave peaks of visible light of respective colors, according to a standard solar visible light spectrum.

For example, as shown in FIG. 3, the control unit performs scanning point sampling for the standard solar visible light spectrum, and can obtain peak value sampling points of n sub-wave peaks, a peak value sampling point of each sub-wave peak corresponds to one wavelength, the wavelength may be referred to as a main wavelength of the sub-wave peak. In the embodiment of the present disclosure, it is assumed that n is 6, then the control unit may obtain 6 main wavelengths. As shown in FIG. 3, visible light of each color corresponds to one main wavelength, wherein, the main wavelength of red light is a1, the main wavelength of orange light is a2, the main wavelength of yellow light is a3, the main wavelength of green light is a4, the main wavelength of indigo light is a5, and the main wavelength of violet light is a6. It should be noted that, n may further be a numerical value greater than 6, and in this case, the visible light of each color may have a plurality of peak values.

Step 502: the control unit determining a spectrum ratio of energy of visible light of a first color within a preset range to spectrum energy of the standard solar visible light, according to a wavelength corresponding to a peak value of a sub-wave peak of the visible light of the first color.

After obtaining the n main wavelengths, the control unit, according to the wavelength corresponding to the peak value of the sub-wave peak of the visible light of the first color, determines the ratio of the spectrum energy of the visible light of the first color within the preset range to the spectrum energy of the standard solar visible light, wherein, the visible light of the first color is the visible light of any one color in the standard solar visible light spectrum. The preset range is a range with a main wavelength of the visible light of the first color as a center, floating left and right by m. For example, as shown in FIG. 3, it is assumed that the visible light of the first color is red light, then the preset range may be [a1−m, a1+m], where a specific numerical value of m may be set according to an actual situation, which will not be limited by the embodiment of the present disclosure; and exemplarily, m may be 0.5.

Herein, the spectrum energy of the visible light of the first color within the preset range may be: an area of the spectrum within the preset range; and as shown in FIG. 3, it is assumed that an area of a shadow Portion A within the range [a1−m, a1+m] is S1, then S1 is just the spectrum energy of the visible light of the first color. Herein, it is assumed that an area of the standard solar visible light spectrum as shown in FIG. 3 is S, then, the ratio of the spectrum energy of the visible light of the first color to the spectrum energy of the standard solar visible light is S1/S. The ratio S1/S is a target energy ratio, which may represent an energy ratio of the visible light of the first color in the standard solar visible light spectrum.

Step 503: the control unit applying current of a preset intensity to the first light emitting chip, according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light.

Herein, the first light emitting chip is a light emitting chip capable of emitting the visible light of the first color, and wavelength ranges of light emitted from the plurality of light emitting chips are within a wavelength range of the standard solar visible light.

For example, the control unit finds a light emitting chip corresponding to the main wavelength of the visible light of the first color, according to the main wavelength of the visible light of the first color, the light emitting chip just being the first light emitting chip. Exemplarily, the control unit may maintain a corresponding relationship between the main wavelength and the light emitting chip, wherein, each light emitting chip may be a chip capable of emitting light of a color of a wave band to which the corresponding main wavelength belongs. Exemplarily, the first light emitting chip is a chip capable of emitting light of the color of the wave band to which the main wavelength a1 belongs. With reference to FIG. 3, the first light emitting chip is the chip capable of emitting red light. The control unit can find the corresponding relationship between the main wavelength and the light emitting chip according to the main wavelength of the visible light of the first color, to obtain the light emitting chip corresponding to the main wavelength of the visible light of the first color.

After finding out the first light emitting chip, the control unit applies a current of the preset intensity to the first light emitting chip, so that the first light emitting chip emits light, wherein, the current of the preset intensity is a current which makes the ratio of the luminous flux of light emitted from the first light emitting chip to the luminous flux of light emitted from the plurality of light emitting chips equal to the ratio of the spectrum energy of the visible light of the first color to the spectrum energy of the standard solar visible light.

Herein, the current of the preset intensity is determined by experiments in advance; in the embodiment of the present disclosure, the number of the light emitting chips is 6, and a process of determining the current of the preset intensity may include that:

The control unit 012 applies a current i1 to each light emitting chip, then, each light emitting chip will emit light; it is assumed that the luminous flux of light emitted from the first light emitting chip is p1, and total luminous flux of light emitted from the 6 light emitting chips is p, then, the ratio of the luminous flux of light emitted from the first light emitting chip to the luminous flux of light emitted from the 6 light emitting chips is p1/p; if p1/p=S1/S, then the control unit 012 determines the current of the preset intensity as i1, and if p1/p≠S1/S, then the control unit 012 applies a current i2 to each light emitting chip, and continues to repeat the above process, until p1/p=S1/S, and the control unit 012 obtains the current of the preset intensity corresponding to the first light emitting chip. In a similar way, the current of the preset intensity corresponding to other light emitting chips can be obtained.

It should be noted that, in the embodiment of the present disclosure, the wavelength ranges of light emitted from the plurality of light emitting chips are within the wavelength range of the standard solar visible light, that is, the wavelength ranges of light emitted from the plurality of light emitting chips are between 770-350 nm.

Since the luminous flux is light energy arriving at, departing from or passing through the curved surface per unit of time, the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips.

In summary, the control method of the light source device provided by the embodiment of the present disclosure, controls the first light emitting chip to emit light according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of respective colors are evenly distributed, which solves the problem that relative high ratio of the blue light in the LED light source causes visual fatigue to the human eyes and even leads to retinal damage, and thus achieving an eye-protection effect.

An embodiment of the present disclosure provides a control method of a light source device, wherein, the light source device 01 comprises: a plurality of light emitting chips 011, the plurality of light emitting chips including a first light emitting chip 011 capable of emitting visible light of a first color. The method comprises: causing the plurality of light emitting chips 011 to emit light simultaneously in order to obtain an operating visible light spectrum; obtaining a first energy ratio of the visible light of the first color in the operating visible light spectrum; comparing the first energy ratio with a target energy ratio S1/S; and adjusting the first energy ratio to the target energy ratio, in response to that the first energy ratio is different from the target energy ratio S1/S.

In the above-described embodiment, the operating visible light spectrum formed by causing the plurality of light emitting chips 011 to emit light simultaneously can be obtained by a spectrometer disposed on a light emergent path of the light source device. As for the obtained operating visible light spectrum, the first energy ratio of the visible light of the first color in the operating visible light spectrum can be obtained, by using a method similar to the method of obtaining the above-described target energy ratio S1/S.

In response to that the first energy ratio is different from the target energy ratio, a current supplied to the first light emitting chip is changed in order to adjust the first energy ratio to the target energy ratio.

Figure 6:
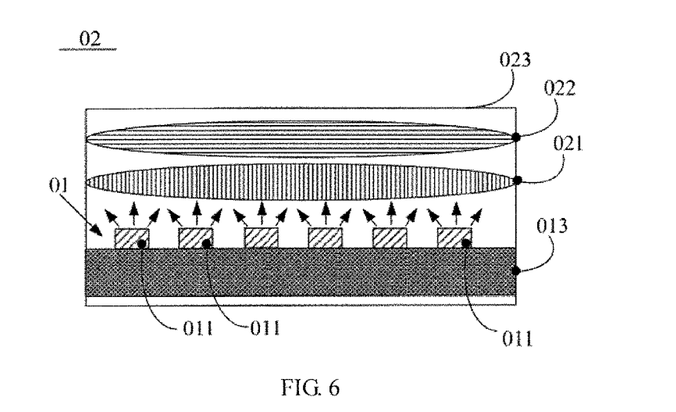
FIG. 6 is a structural schematic diagram of a backlight module provided by an embodiment of the present disclosure.

FIG. 6 shows a structural schematic diagram of a backlight module 02 provided by an embodiment of the present disclosure, and with reference to FIG. 6, the backlight module 02 comprises: a light source 01 shown in FIG. 2. Herein, a control unit in the light source 01 is not shown in FIG. 6.

Further, with reference to FIG. 6, the backlight module 02 further comprises: a focusing lens 021. The focusing lens 021 is disposed on a side of a heat radiating supporter 013 of the light source 01 where light emitting chips 011 are disposed. Herein, the focusing lens 021 is capable of focusing light rays emitted from the light source 01, improving incident capacity of the light rays, and evenly distributing light rays of respective colors.

Further, the backlight module 02 further comprises: a collimating lens 022. The collimating lens 022 is disposed on a side of the focusing lens 021 away from the light source 01. Herein, the focusing lens 021 is disposed so that light rays passing through the collimating lens 022 are parallel, to improve a collimation property of the light rays passing through the collimating lens 022. Thereby, light rays provided by the backlight module 02 are parallel, forming a surface light source.

It should be noted that, as shown in FIG. 6, the light source 01, the focusing lens 021 and the collimating lens 022 may be packaged together by using a housing 023.

Figure 7:
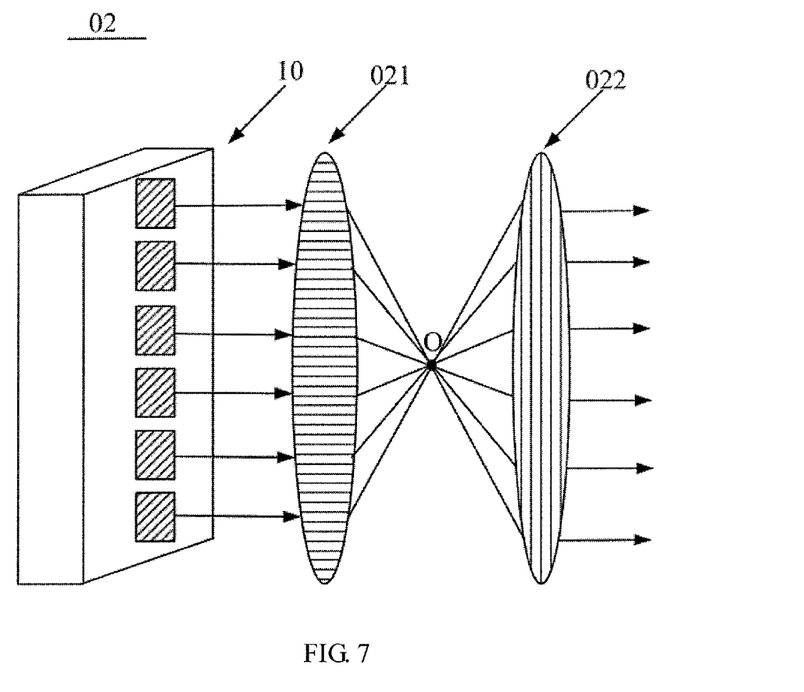
FIG. 7 is a principle diagram of a backlight module provided by the embodiment of the present disclosure.

For example, FIG. 7 shows a principle diagram of a backlight module 02. With reference to FIG. 7, the light rays emitted from the light source 01 are firstly incident to the focusing lens 021. The focusing lens 021 converges the light rays, so that the light rays are converged at a point O (the point O may be referred to a focus point of the focusing lens 021). Light rays passing through the focusing lens 021 and the focus point O are incident into the collimating lens 022. The collimating lens 022 can improve the collimation property of the light rays passing therethrough. With reference to FIG. 7, the respective light rays passing through collimating lens 022 are parallel, and are perpendicular to a light exit surface of the collimating lens 022.

It should be noted that, in the embodiment of the present disclosure, the light source 01 may be a light source of a side-lit type or a light source of a direct-lit type, wherein the light source of the side-lit type is disposed on a side surface of a light guide plate, while the light source of the direct-lit type is disposed on a back surface of the light guide plate. Alternatively, the backlight module 02 further comprises: a light guide plate 024.

Figure 8:
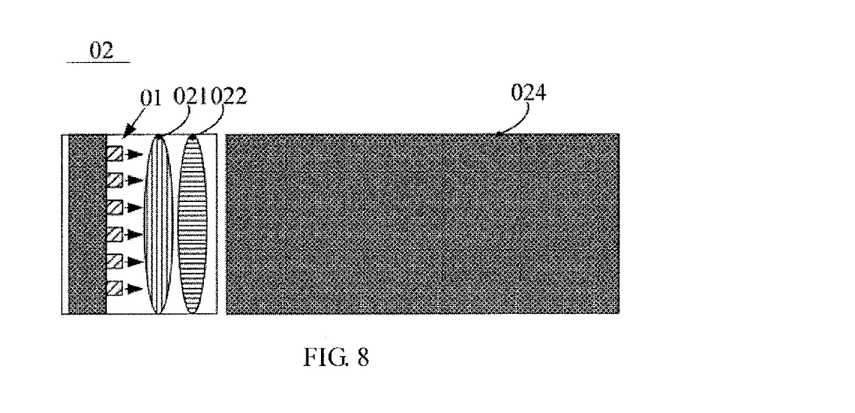
FIG. 8 is a structural schematic diagram of another backlight module provided by an embodiment of the present disclosure.
Figure 9:
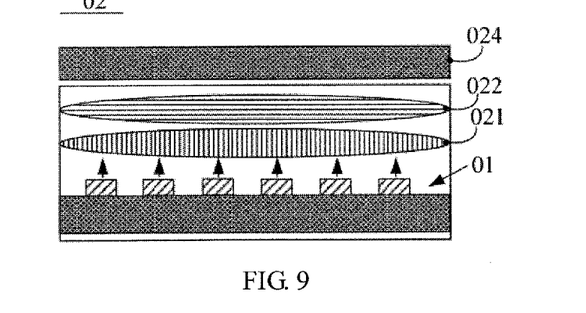
FIG. 9 is a structural schematic diagram of a further backlight module provided by an embodiment of the present disclosure.

The light source 01 may be dispose on the back surface of the light guide plate 024; or, the light source 01 may also be disposed on the side surface of the light guide plate 024. Herein, when the light source 01 is disposed on the side surface of the light guide plate 024, the backlight module 02 is as shown in FIG. 8. In this case, the focusing lens 021 and the collimating lens 022 together with the light source 01 are disposed on the side surface of the light guide plate 024, and the backlight module 02 may be referred to as a backlight module of a side-lit type; FIG. 9 shows a backlight module 02 in which the light source 01 is disposed on the back surface of the light guide plate 024. In this case, the focusing lens 021 and the collimating lens 022 together with the light source 01 are disposed on the back surface of the light guide plate 024, and the backlight module 02 may be referred to as a backlight module of a direct-lit type.

In summary, the backlight module provided by the embodiment of the present disclosure, controls the first light emitting chip to emit light according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of respective colors are evenly distributed, which solves the problem that the relative high ratio of the blue light in the LED light source causes visual fatigue of the human eyes and even leads to retinal damage, and thus achieving an eye-protection effect.

Figure 10:
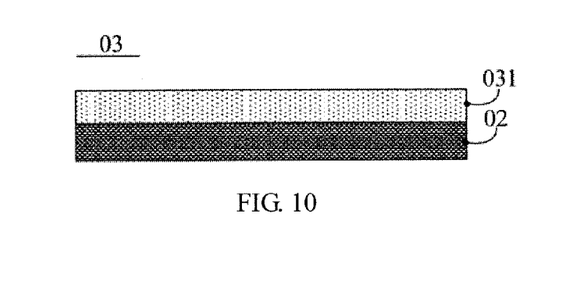
FIG. 10 is a structural schematic diagram of a liquid crystal display device provided by an embodiment of the present disclosure.

FIG. 10 shows a structural schematic diagram of a liquid crystal display device 03 provided by an embodiment of the present disclosure. With reference to FIG. 10, the liquid crystal display device 03 comprises: a display panel 031 and a backlight module 02, and the backlight module 02 can be any backlight module as shown in FIG. 6, FIG. 8 or FIG. 9.

Figure 11:
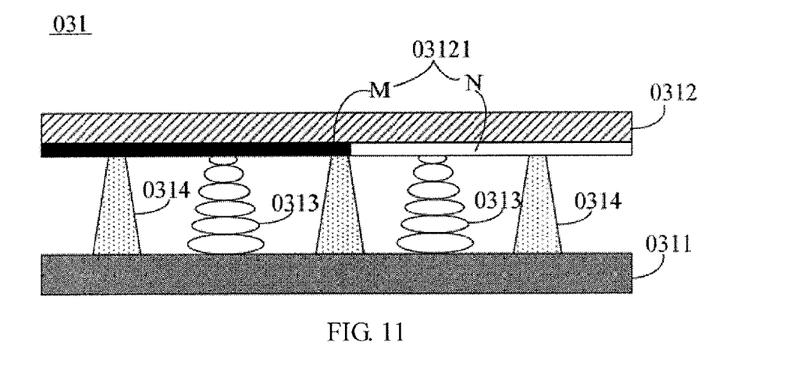
FIG. 11 is a structural schematic diagram of a display panel provided by an embodiment of the present disclosure.

FIG. 11 shows a structural schematic diagram of a display panel 031. With reference to FIG. 11, the display panel 031 includes: an array substrate 0311 and a color filter substrate 0312 which are cell assembled. The color filter substrate 0312 including a color filter layer 03121, and the color filter layer 03121 including a black matrix M and an open region N. The open region N is a portion of each color pixel allowing light rays pass therethrough, other than a wiring portion and a transistor portion of each color pixel (which are usually shielded by using a black matrix).

Herein, the display panel 031 may further include: a liquid crystal 0313 filled between the array substrate 0311 and the color filter substrate 0312. Spacers 0314 are further disposed between the array substrate 0311 and the color filter substrate 0312, the spacer 0314 for supporting the array substrate 0311 and the color filter substrate 0312 are in contact with the array substrate 0311 and the color filter substrate 0312, so that a space formed between the array substrate 0311 and the color filter substrate 0312 to accommodate the liquid crystal 0313.

In summary, the liquid crystal display device provided by the embodiment of the present disclosure, controls the first light emitting chip to emit light according to the ratio of the spectrum energy of the visible light of the first color to the spectrum energy of the standard solar visible light, so that the ratio of the luminous flux of light emitted from the first light emitting chip to the luminous flux of light emitted from the plurality of light emitting chips is equal to the ratio of the spectrum energy of the visible light of the first color to the spectrum energy of the standard solar visible light; since the ratio of the luminous flux of light emitted from the first light emitting chip to the luminous flux of light emitted from the plurality of light emitting chips is just the ratio of the light energy of light emitted from the first light emitting chip to the light energy of light emitted from the plurality of light emitting chips, in the light source device provided by the embodiment of the present disclosure, light rays of respective colors are evenly distributed, which solves the problem that the relative high ratio of the blue light in the LED light source causes visual fatigue of the human eyes and even leads to retinal damage, and thus achieving an eye-protection effect.

A related black and white display device is fabricated on a electrophoresis principle, usually without a light source; the black and white display device has black particles with a negative electric charge and white particles with a positive electric charge packaged therein; by changing an electric charge, the black particle and the white particle are arranged in order, thus achieving a black and white visual effect. Limited by a material and a fabrication processes, it is difficult for the related black and white display device to achieve a high resolution of a screen. In the liquid crystal display device provided by the embodiment of the present disclosure, because the color filter substrate of the display panel includes the black matrix and the open region thereon, the display panel is a black and white display panel, and since a solar spectrum light source is used, the high resolution can be achieved.

The liquid crystal display device provided by the embodiment of the present disclosure, has anti-fatigue and eye-protection features, and is easy to implement high-resolution display, which is especially applicable to a display screen of an electronic book for children or an anti-fatigue eye-protection electronic book, etc.

Those ordinarily skilled in the art can understand that all or part of the steps of the method for implementing the above embodiments can be performed by either hardware, or program instruction-related hardware; and the corresponding program can be stored in a computer-readable storage medium, such as ROM, magnetic disk or optical disk, etc.

Although the present disclosure is described in detail hereinbefore with general illustration and embodiments, based on the present disclosure, certain amendments or improvements can be made thereto, which is obvious for those skilled in the art. Therefore, the amendments or improvements made to the disclosure without departing from the spirit of the disclosure should be within the scope of the disclosure.

The present application claims priority of Chinese Patent Application No. 201510194968.7 filed on Apr. 22, 2015, the disclosure of which is incorporated herein by reference in its entirety as part of the present application.

The invention claimed is:

1. A backlight module, comprising:
   a light source device, comprising: a plurality of light emitting chips and a control unit, wherein, the plurality of light emitting chips include a first light emitting chip for emitting visible light of a first color; the control unit is configured to obtain a first energy ratio of the visible light of the first color in an operating visible light spectrum in a case where the plurality of light emitting chips emit light simultaneously, compare the first energy ratio with a target energy ratio, and adjust the first energy ratio to the target enemy ratio in response to that the first energy ratio is different from the target energy ratio; and
   a first lens and a second lens disposed on a light output side of the plurality of light emitting chips, wherein, the first lens is disposed between the second lens and the plurality of light emitting chips, the first lens is configured to converge light rays from the plurality of light emitting chips, and the second lens is configured to change convergent light rays emitted from the first lens into parallel light rays.

2. The backlight module according to claim 1, wherein, the backlight module further comprises: a light guide plate, the light source device being disposed on a back surface of the light guide plate; or, the light source device being disposed on a side surface of the light guide plate.

3. The backlight module according to claim 1, wherein, the target energy ratio is an energy ratio of the visible light of the first color in a solar visible light spectrum.

4. The backlight module according to claim 3, wherein, the control unit is configured to change a current supplied to the first light emitting chip in order to adjust the first energy ratio to the target energy ratio, in response to that the first energy ratio is different from the target energy ratio.

5. A liquid crystal display device, comprising:
   a display panel and a backlight module, the backlight module comprising: a light source device, comprising:

a plurality of light emitting chips and a control unit, wherein, the plurality of light emitting chips include a first light emitting chip for emitting visible light of a first color;

the control unit is configured to obtain a first energy ratio of the visible light of the first color in an operating visible light spectrum in a case where the plurality of light emitting chips emit light simultaneously, compare the first energy ratio with a target energy ratio, and adjust the first energy ratio to the target energy ratio in response to that the first energy ratio is different from the target energy ratio, wherein the backlight module further comprises a first lens and a second lens disposed on a light output side of the plurality of light emitting chips, wherein, the first lens is disposed between the second lens and the plurality of light emitting chips, the first lens is configured to converge light rays from the plurality of light emitting chips, and the second lens is configured to change convergent light rays emitted from the first lens into parallel light rays.

6. The liquid crystal display device according to claim 5, wherein, the display panel includes an array substrate and a color filter substrate cell-assembled, the color filter substrate including a color filter layer, and the color filter layer including a black matrix and an open region.

7. The liquid crystal display device according to claim 5, wherein, the target energy ratio is an energy ratio of the visible light of the first color in a solar visible light spectrum.

8. The liquid crystal display device according to claim 5, wherein, the control unit is configured to change a current supplied to the first light emitting chip in order to adjust the first energy ratio to the target energy ratio, in response to that the first energy ratio is different from the target energy ratio.

9. The liquid crystal display device according to claim 5, wherein, the backlight module further comprises: a light guide plate, the light source device being disposed on a back surface of the light guide plate; or, the light source device being disposed on a side surface of the light guide plate.

\* \* \* \* \*